United States Patent [19]
Ciambella et al.

[11] Patent Number: 4,583,521
[45] Date of Patent: Apr. 22, 1986

[54] PORTABLE SOLAR COOKING APPARATUS

[76] Inventors: Bart C. Ciambella, 326 Woodward Dr., West Seneca, N.Y. 14224; Daryl P. Ciambella, 100 Randy Way, Cheektowaga, N.Y. 14227; Perry A. Ciambella, 370 Peralta Ave., Long Beach, Calif. 90813

[21] Appl. No.: 724,249

[22] Filed: Apr. 17, 1985

[51] Int. Cl.$^4$ .............................................. F24J 2/02
[52] U.S. Cl. ................................. 126/451; 126/438; 350/616; 350/626; 350/612
[58] Field of Search ................. 126/451, 438, 443; 350/603, 612, 631, 613, 614, 615, 626

[56] References Cited

U.S. PATENT DOCUMENTS

| | | | |
|---|---|---|---|
| 3,613,659 | 10/1971 | Phillips | 126/451 X |
| 4,196,721 | 4/1980 | Posnansky | 126/451 |
| 4,281,644 | 8/1981 | Chiles | 126/451 |

Primary Examiner—Randall L. Green
Attorney, Agent, or Firm—Allan M. Shapiro

[57] ABSTRACT

The cooking apparatus has a reflector shaped to concentrate the sun's rays and direct them onto a cooking vessel. The reflector is formed of at least two panels, each of which has a surface contour which interfits the other when they are folded together face-to-face. Suitable supports position the reflector panels with respect to the sun angle. A target arm holds the cooking vessel at the focal point for receiving the sun's concentrated rays. The cooking vessel may be a jar or a double-sided interfitting grill.

20 Claims, 11 Drawing Figures

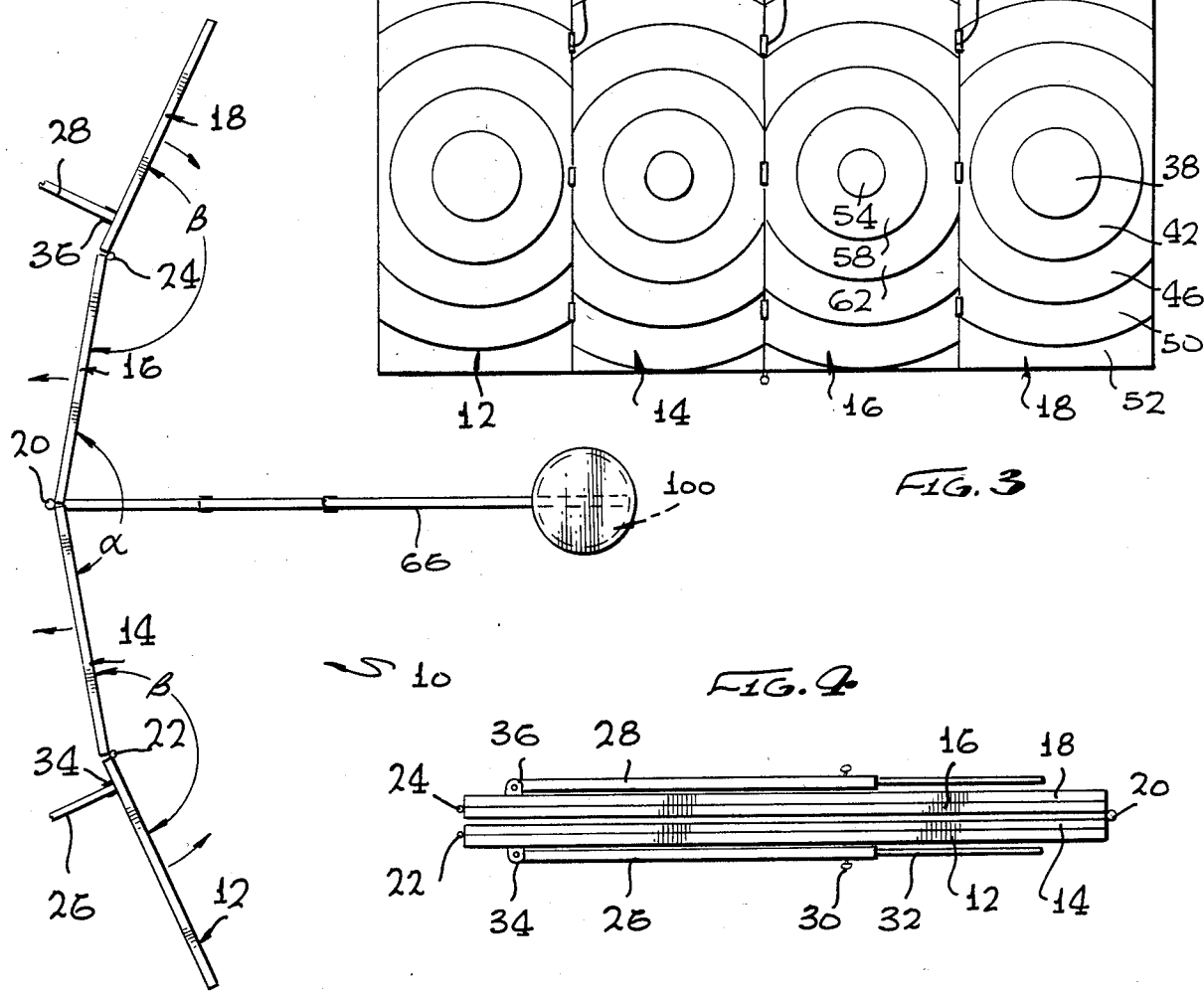

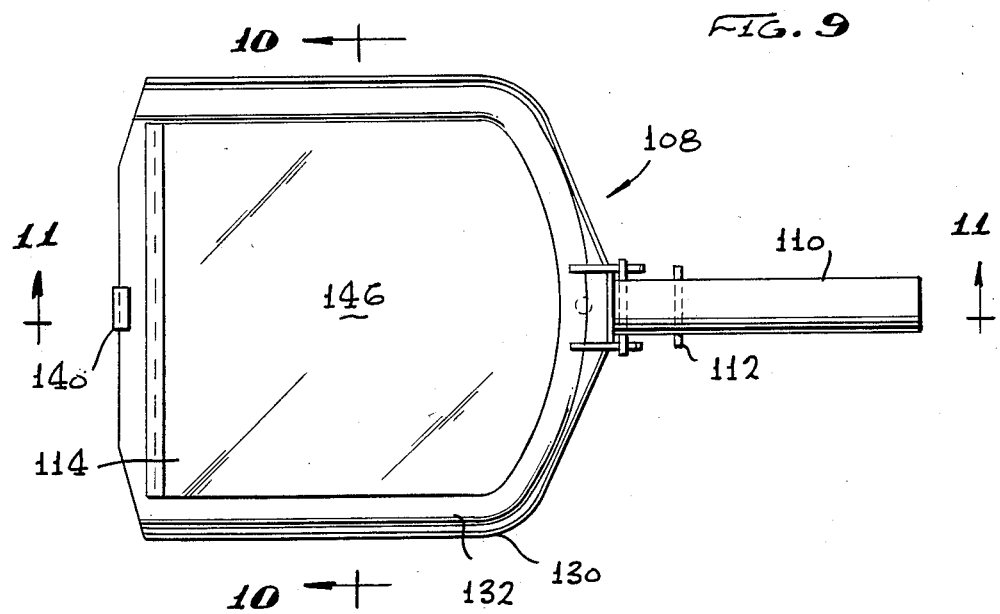
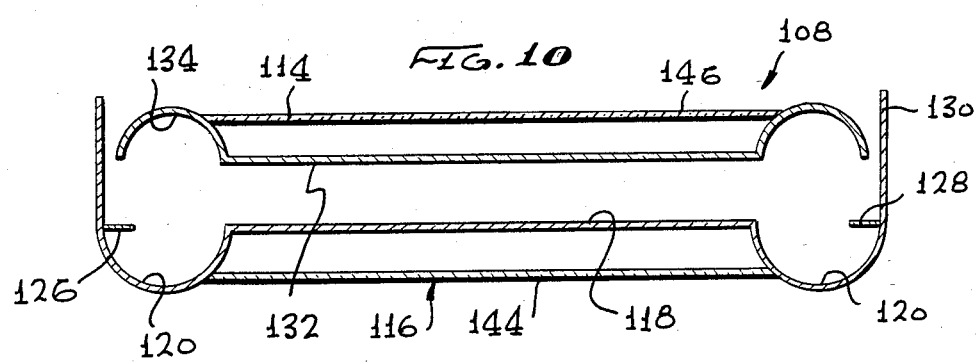
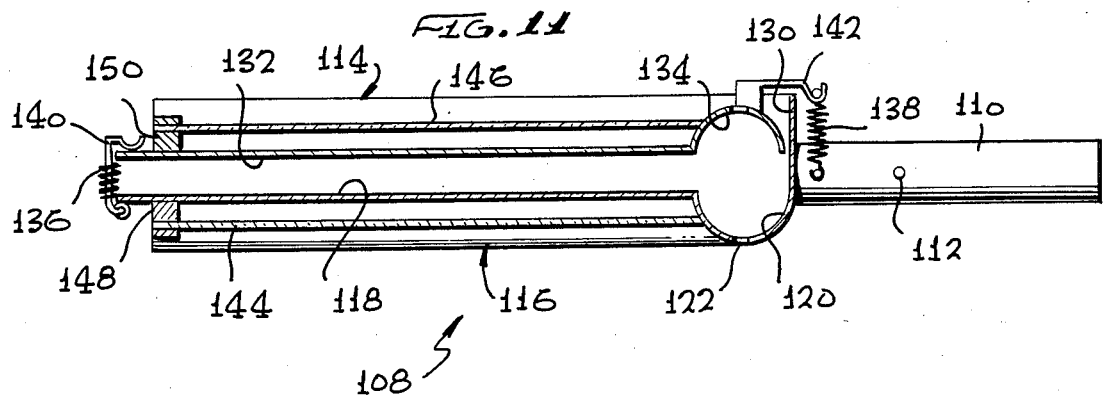

PORTABLE SOLAR COOKING APPARATUS

BACKGROUND OF THE INVENTION

This invention is directed to a cooking apparatus which includes a plurality of interfitting reflector panels and a cooking vessel positionable at the focus of the panels, all of foldable and compact arrangement for convenient storage, ease of transport, convenient setup, and satisfactory use.

Many persons enjoy leaving the conveniences of civilization to such an extent and for such a time that access to the usual cooking facilities is impossible. When a person in such a circumstance desires a cooked meal, he must take along cooking equipment or resort to the use of local fuels. In some areas, there is inadequate local fuel, and, in other areas, it is improper to bring such fuels. As a consequence, many such travelers carry fuel with them. Of course, when the traveler is carrying all of his requirements on his back, he desires to minimize the weight. Accordingly, there is a need for a solar cooking apparatus which can be readily packed and carried so that food may be cooked without resort to the burning of fuel.

SUMMARY OF THE INVENTION

In order to aid in the understanding of this invention, it can be stated in essentially summary form that it is directed to a potable solar cooking apparatus which includes at least two reflector panels, each being shaped to reflect and concentrate the sun onto a cooking vessel, with the reflector panels interfitting to save space while they are packed. The cooking vessel is held at the target spot, and the cooking vessel may be in the form of a grill with interfitting grill sections.

It is, thus, an object and advantage of this invention to provide a portable solar cooking apparatus which can be conveniently folded for storage, protection in transit, and may be opened for cooking by concentration of the sun's rays onto a cooking vessel.

It is another object and advantage of this invention to provide a cooking apparatus which has at least two solar reflector panels which can be folded together face-to-face or opened up at an angle with respect to each other so that each reflects concentrated solar rays onto a cooking vessel.

It is another object and advantage of this invention to provide a cooking vessel for a solar cooking apparatus wherein the cooking vessel comprises a glass jar having a liner therein so that the glass jar receives solar radiation into the cooking vessel and inhibits outflowing radiant heat.

It is a further object and advantage of this invention to provide a cooking vessel for a solar cooking apparatus, wherein the cooking vessel includes interfitting grill sections, with each of the grill sections having interfitting troughs therein to retain liquids cooked off during grilling operations.

The features of the present invention which are believed to be novel are set forth with particularly in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is a side-elevational view of the portable solar cooking apparatus of this invention.

FIG. 2 is a view looking generally down the plane of the reflector panels of the apparatus, as seen generally along the line 2 as seen in FIG. 1.

FIG. 3 is a plan view of the several reflector panels in the deployed position.

FIG. 4 is a view of the apparatus in the folded condition.

FIG. 9 is an enlarged plan view, as seen generally along the line 9—9 of FIG. 8.

FIG. 10 is a further enlarged section taken generally along the line 10—10 of FIG. 9.

FIG. 11 is an enlarged longitudinal section through the grill-type cooking vessel as seen generally along the line 11—11 of FIG. 9.

DESCRIPTION OF THE PREFERRED EMBODIMENT

Figure 5:
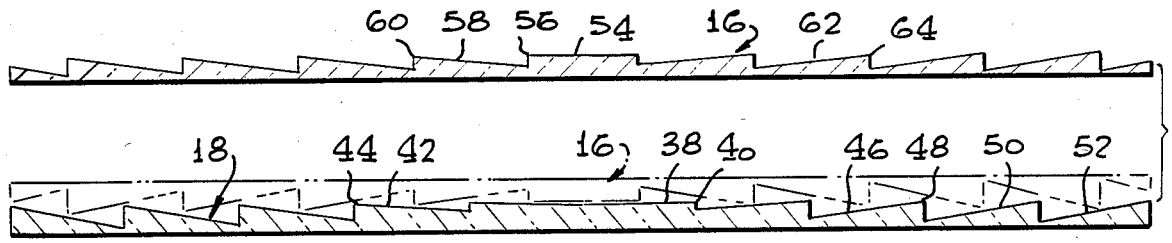
FIG. 5 is an enlarged section through a pair of adjacent reflector panels of the apparatus, showing in dashed lines the manner in which they interfit.

The portable solar cooking apparatus of this invention is generally indicated at 10 in FIGS. 1 and 2. The cooking apparatus comprises a plurality of reflector panels which reflect the sun onto a cooking vessel supported on a target arm. There are at least two reflector panels, and four is the preferred number. Reflector panels 12, 14, 16 and 18 are shown in FIGS. 2 and 3. The reflector panels are preferably rectangular so that they can be conveniently hinged together. Hinge set 20 is a plurality of hinges on a hinge axis, with the hinges secured to reflector panels 14 and 16 in such a manner that the panels can be swung to a closed position where the panels 14 and 16 lie back-to-back, in the direction of the arrows in FIG. 2. In addition, the hinge set 20 permits the panels 14 and 16 to be hinged to an obtuse angle alpha between the adjacent faces of the panels, less than 180 degrees, as shown in FIG. 2. Hinge set 22 is a plurality of hinges on a single axis with the hinges secured to reflector panels 12 and 14. The hinges are arranged so that the panels 12 and 14 can be swung from a closed, face-to-face position to an open position with the obtuse angle beta between the faces of the panels. The angle beta is an obtuse angle, similar to the angle alpha. Hinge set 24 is secured between panels 16 and 18 to permit the same folding action as the hinge set 22 permits between panels 12 and 14. Thus, panels 16 and 18 can be hinged closed to a face-to-face position and open to a position indicated by the obtuse angle beta. The hinges in the hinge sets are preferably firm in their hinging action or tightenable so that when the panels are hinged open to the configuration indicated in FIGS. 1 and 2, the hinges retain the panels in their correct angular relationship. Furthermore, the hinge sets thus described permit the panels to be folded together with panels 12 and 14 in the face-to-face relationship, the panels 14 and 16 in backto-back relationship, and the panels 16 and 18 in face-to-face relationship, with the folded configuration shown in FIG. 4.

Stands are provided to support the reflector panels at an angle above the ground, as shown in FIG. 1. Stands 26 and 28 are shown in FIG. 2. The stands are telescoping, as shown in FIG. 1, and have a manually operable set screw 30 for locking the telescoping leg 32 at the proper extension. The stands are respectively pivoted in U-shaped brackets 34 and 36, which are respectively secured on the back of panels 12 and 18 close to the hinge point. When thus configured, the stands lie on the outside of the assembly when it is folded to the closed position shown in FIG. 2. If preferred and if the stands could be made sufficiently thin, the stands could be placed on the backs of panels 14 and 16 close to the hinge sets 22 and 24 so that the stands would lie on the interior of the assembly when closed. These stands permit the reflector panels to be positioned with respect to the sun angle so that the sun is reflected toward a particular focal point.

In order to concentrate the sun energy, the faces of the reflector panels are configured other than planar. As seen in FIGS. 3 and 5, reflector panels 16 and 18 have a shaped reflector face which is shaped to reflect the solar radiation toward a fairly small and fairly nearby target. A parabolic reflector would be desirably from an optical viewpoint, but in order to provide a convenient, flat package, as shown in FIG. 4, the reflector face is divided in order that the panels can be substantially planar. Thus, the reflective faces of the panels are divided into concentric rings so that they are Fresnel reflectors. Furthermore, since the target, described hereinafter, is not a small target, the more precise optics of a Fresnel parabolic reflector is not necessary. The circular reflective segments of the reflector panels could be conical and would provide sufficient concentration for this purpose.

It is important to note that the faces of panels 14 and 16 are the same, and the faces of panels 12 and 18 are the same as each other and different than the panels 14 and 16. This is illustrated in detail in FIG. 5 where the panel 16 is offset to a position above panel 18 for convenience of space and illustration. Normally, these panels would be hinged edge-to-edge with the hinge set 24. As seen in FIG. 5, reflector panel 18 has a large circular central section 38 which terminates in an edge 40. The central section may be flat or may be the central portion of the parabolic reflector, or a configuration between. Outside of the central section is circular section 42 which terminates in edge 44. Farther out is circular section 46 which terminates in edge 48. Two more circular sections 50 and 52 are positioned in the outward direction. Each of them may be a portion of a parabola, a conical section or the like. The more circular sections there are, the more nearly a conical section approximates the parabola. The number of circular sections is merely illustrative and more or less can be used.

The reflector panel 16 has a similar configuration with a circular central section 54 which terminates in circular edge 56. Outward of that is circular section 58 which terminates in edge 60. Outward from that, circular section 62 terminates in circular section edge 64. As seen in the upper part of FIG. 5, further circular sections extend all the way to the ends of the panel. Similarly to panel 18, the reflective surfaces may be conical, parabolic or something inbetween to define a Fresnel reflective surface. More or less circular sections may be used. What is significant about these circular sections is that when the panels 16 and 18 are turned face-to-face, as shown in the lower part of FIG. 5 where the panel 16 is shown in dashed lines, the central section 54 is smaller than the central section 38 so that the edge 40 of the central section 38 lies halfway up the ramp of the circular section 58. This continues all the way out to the outer edge. In this way, the circular sections of the reflector panels are interfitting so that they interlie with each other. Since they interlie, they have twice as much contact point to provide mutual support and they save packing space. Each circular section edge lies approximately in the center of an opposing circular section so that each edge is supported and each circular section is supported. In summary, it can be stated that the diameters of the circular sections of facing reflector panels are one-half pitch different in order to provide the interengagement. In addition, it is noted that the sections need not necessarily be circular, as illustrated, but could be oval or rectangular, as long as there were sections which provided reflection toward the target. However, in each case, on adjacent reflector panels which fold together face-to-face, the pitch would be different by one-half section in order to achieve the interlocking.

Target arm 66 is attached on its lower end to the juncture between reflector panels 14 and 16, preferably on the lower hinge of hinge set 20. The target arm has a leg 68 which hooks between the panels 14 and 16 onto the central hinge of hinge set 20. In addition, target arm 66 has telescoping stand 70 attached thereto adjacent its midpoint. Leg 72 telescopes therefrom and is secured in selected position by set screw 74.

The upper end of target arm 66 has target carrier 76 thereon. As shown in FIG. 1, the target carrier is U-shaped and may be pivoted on the upper end of the target arm 66. Target carrier 76 is shown in more detail in FIG. 6. Its riser arm 78 carries transverse socket 80 thereon with the socket having a transverse opening therethrough. The socket defines an axis which lies substantially on the focal point of the reflector panels. Below socket 80, hook 82 is carried on riser arm 78 for purposes hereinafter described. Above socket 80, a stub end of the riser arm 78 stands upwardly in alignment with the riser arm. The stub end is received in sleeve 84. Sleeve 84 is detachably secured on the stub end by means of set screw 86. Hinge 88 on the top of sleeve 84 carries U-shaped bottle carrier 90. The U-shape of the bottle carrier is such that smaller and larger screw caps 92 and 94 have axes which are substantially on the axis of socket 80.

Figure 6:
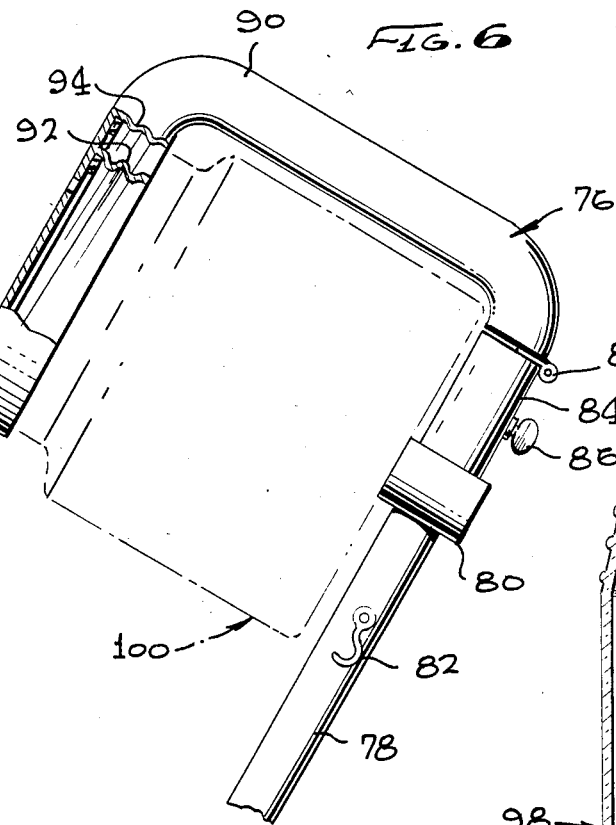
FIG. 6 is a side-elevational view of a portion of the target arm which supports the cooking vessel, with parts broken away and parts taken in section.
Figure 7:
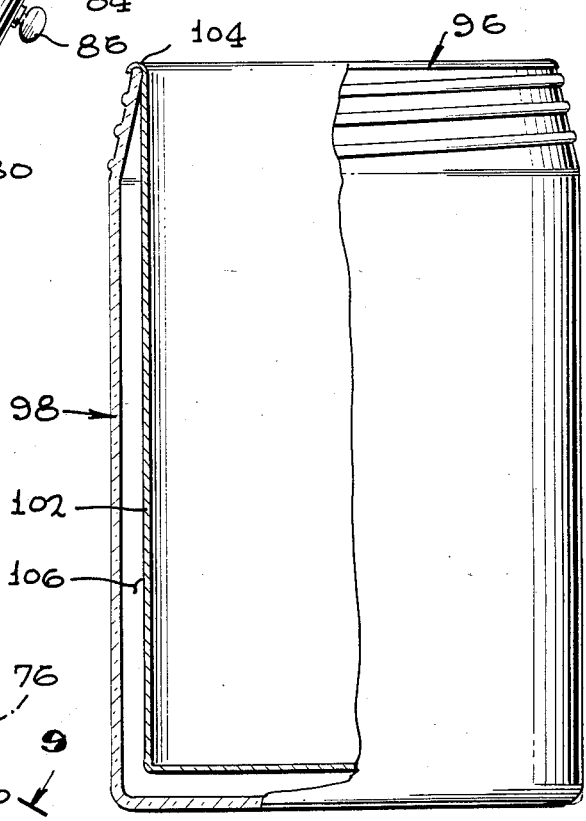
FIG. 7 is a side-elevational view, with parts broken away and parts taken in section, of a jar-shaped cooking vessel.

Jar 96 is illustrated in FIG. 7. The jar 96 is a glass jar body 98 which has an open mouth and external screw threads adjacent the mouth so that it may screw into one of the screw caps 92 and 94. Jar 96 is proportioned as the smaller jar which attaches on cap 92. Jar 100, shown in dashed lines in FIG. 6, is proportioned as the larger jar which fits on the screw cap 94. The jars are similar, except for body size. The glass jar body 98 is of a heat-resistant glass which is preferably suitably tempered to withstand temperature differentials. Pyrex glass is suitable. Container 102 is inserted within jar body 98 and preferably has a lip 104 which engages over the top edge of glass jar body 98 to hold the container in place. The position of container 102 within glass jar body 98 is such that the container is spaced from the body all around, except at lip 104, in order to maintain an insulative space 106 therebetween. The space 106 serves as an insulator, whether it contains air or is at vacuum. The container 102 can conveniently be made of aluminum, with its exterior black-anodized to convert the incident radiation to infrared to cause heating of the container 102 and its contents. The insulation space 106 maintains efficiency of heating and maintains the heated contents at temperature. The container 102 and its companion container 100, which is of the same general construction, can conveniently be used for heating liquid and for heating liquid containing foods.

Figure 8:
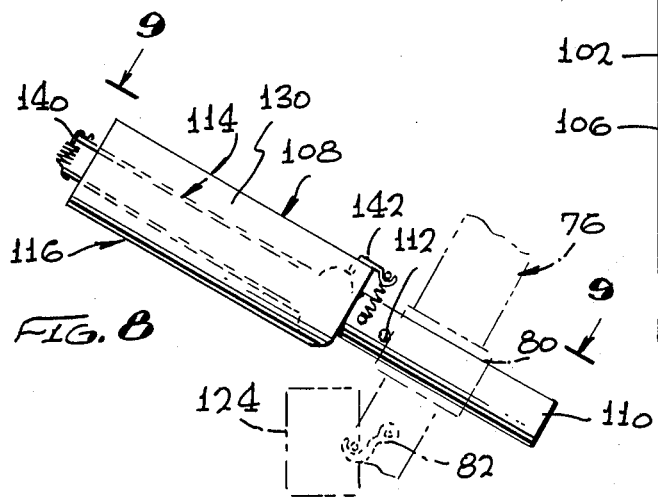
FIG. 8 is a side-elevational view of a grill-type cooking vessel, shown supported in the target arm shown in dashed lines.

Griddle 108, shown in FIGS. 8, 9, 10 and 11, is suitable for cooking meat. Griddle 108 has handle 110 which is circular in section and is sized to fit through socket 80. Cross pin 112 positions the griddle with respect to socket 80, as shown in FIG. 8, in order to position the cooking portion of the griddle substantially at the focal point of the reflector panels. As is seen in FIGS. 10 and 11, griddle 108 is formed of upper and lower griddle portions 114 and 116. The lower portion 116 is mounted on handle 110, as seen in FIG. 11. The lower griddle portion 16 principally comprises cooking panel 118 which is a substantially flat cooking surface. It is surrounded on three sides by grease trough 120 which is partially half toroidal. The left and right portions of the grease trough 120 is seen in FIG. 10, while that close to the handle is shown in FIG. 11. The several portions of the grease trough are connected, and a drain hole 122 is provided close to the handle. It is adjacent this drain hole that hook 82 carries cup 124 to receive the draining grease. The grease trough is configured so that in nearly any handle-down orientation of the griddle, the grease is received in the trough, and when lower griddle portion 116 is down, grease drains from drain hole 122. In order to maintain the grease captured in the trough 120, stop flanges 126 and 128 are positioned in the left and right portions of the trough 120, extending inwardly from the outer walls thereof. The stop flanges 126 and 128 are positioned substantially on the plane of the lower cooking panel 118 and wall 130 extends upwardly therefrom.

Wall 130 is sized so that the upper griddle portion 114 can fit interiorly thereof, as shown in FIGS. 9, 10 and 11. Upper griddle portion 114 is very similar to the lower griddle portion 116. Upper griddle portion 114 has a cooking panel 130 which faces the cooking panel 118. In addition, grease trough 134 adjoins the cooking panel and faces the grease trough 120. As seen in FIG. 9, grease trough 134 is generally U-shaped, the same as grease trough 120. Springs 136 and 138 respectively cooperate with latch 140 and spring hook 142 to resiliently draw the cooking panels toward each other. The springs with their associated structure permit food articles to be cooked to be placed between the cooking panels and permit the food articles to be of different initial thicknesses and different shrinkage characteristics while maintaining the cooking panels in contact with the food article. In this way, the food article is securely held and is maintained in contact with both cooking panels.

Glass cover 144 is provided below lower cooking panel 118, while glass cover 146 is provided above upper cooking panel 132. These glass covers adjoin the respective grease troughs, and at the left, open end of the grease troughs are provided with closure stops 148 and 150, see FIG. 11. These glass covers provide a closed space adjacent the cooking panels to provide insulation while the glass covers inhibit infrared radiation so that cooking temperatures can be reduced and maintained. The cooking panels and adjacent grease troughs are preferably made of aluminum and are preferably black-anodized on the exterior. The glass covers are preferably annealed, heat-resistant glass such as Pyrex. Handle 110 fits within transverse socket 80 in such a manner that either of the griddle portions can face the reflector panels. In this way, first one side and then the other of the food material within the griddle can be cooked. The troughs are oriented in such a manner that the grease runs toward the handle and when the drain 122 is rotated to the downward position, grease drains out into the cup 124.

The portable solar cooking apparatus can be folded into compact condition for storage and transportation. Since the apparatus is designed for easy and light transport, the various parts are made of light, strong materials which can be readily folded and extended for use. The reflector panels may be made of a formed polymer composition material with an aluminized, front-reflective surface. The formed panel can be supported by a foamed backing, also of synthetic polymer composition material. In this way, a reasonable strength with very light weight is achieved. The various supports and legs are telescoped together and folded. When the stands 26 and 28 are outboard from the hinges, they lie on the exterior of the assembly, as shown in FIG. 4. When they are inboard of the hinges, they would lie interiorly of the panels 14 and 16. Furthermore, only one stand may be required. In any event, sufficient flexibility, tightening of the joints, and telescoping are provided so that the individual reflector panels can be positioned so that the reflected sunlight is directed at the target axis. Furthermore, the target arm 66 positions and retains either the jar or the griddle at the target axis to achieve heating thereof. A convenient portable solar cooking apparatus is thus obtained.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A portable solar cooking apparatus comprising:
   at least first and second reflector panels, said first reflector panel having a shaped surface configuration for reflecting solar radiation generally toward a focal point, said second reflector panel also having a shaped surface configuration for reflecting solar radiation toward the focal point, said surface configuration of said first panel interfitting with said surface configuration of said second panel when said panels are placed face-to-face so that said first and second panels mutually support each other and occupy less thickness than without interfitting; and
   means for supporting material to be heated adjacent the focal point.

2. The apparatus of claim 1 wherein said means for supporting includes a vessel for containing material to be heated together with at least a partial glass enclosure for said vessel.

3. The apparatus of claim 2 wherein a target arm supports said means, said arm being connected to said reflector panels and to said vessel.

4. The apparatus of claim 3 wherein said vessel is a tubular vessel contained within a glas jar.

5. The apparatus of claim 4 wherein said glass jar is screwed into a screw cap mounted on said arm.

6. The apparatus of claim 5 wherein said reflector panels are hinged together so that when hinged in face-to-face relationship said surface configuration of said panels interfit and support each other.

7. The aparatus of claim 6 wherein there are four of said reflector panels with two of said first panels and two of said second panels so that one of said first panels and one of said second panels interfit and the other of said first panels and the other of said second panels interfit when folded face-to-face.

8. The apparatus of claim 1 wherein said reflector panels are hinged together so that when hinged in face-to-face relationship said surface configuration of said panels interfit and support each other.

9. The apparatus of claim 8 wherein there are four of said reflector panels with two of said first panels and two of said second panels so that one of said first panels and one of said second panels interfit and the other of said first panels and the other of said second panels interfit when folded face-to-face.

10. The apparatus of claim 9 further including means for supporting said reflector panels with respect to the ground, said means for supporting being sufficiently adjustable so that said reflector panels can be oriented with respect to the sun and said target means for directing the reflection from each of said reflector panels toward said target means.

11. The apparatus of claim 10 wherein said support means comprises at least one telescoping leg adjustably secured to one of said panels.

12. The apparatus of claim 1 further including means for supporting said reflector panels with respect to the ground, said means for supporting being sufficiently adjustable so that said reflector panels can be oriented with respect to the sun and said target means for directing the reflection from each of said reflector panels toward said target means.

13. The apparatus of claim 12 wherein said support means comprises at least one telescoping leg adjustably secured to one of said panels.

14. The solar cooking apparatus of claim 1 wherein said means for supporting material comprises:
a support extending toward said focal point; and
a vessel mounted on said support at said focal point, said vessel comprising a metallic container having a radiation-receiving surface and a glass jar embracing said container, said support having glass jar securing means therein so that said glass jar can be secured in said support to retain said container at the focal point.

15. The apparatus of claim 14 wherein said glass jar securing means comprises screw threads and said glass jar has corresponding screw threads thereon for interengagement and securement of said glass jar together with said container therein.

16. The apparatus of claim 15 wherein said vessel support comprises an upstanding riser arm having a hinge adjacent the top thereof so that said screw threaded support can be hinged away from said riser arm.

17. The solar cooking apparatus of claim 1 wherein said means for supporting material comprises
a support extending toward said focal point; and
a vessel mounted on said support at said focal point, said vessel comprising first and second facing griddle portions, said second griddle portion being releaseably attached to said first griddle portion and said first griddle portion being releaseably attached to said support.

18. The apparatus of claim 17 wherein at least one of said griddle portions has a grease trough adjacent an edge thereof so that grease rendered from a food article between said first griddle portion is trapped in said grease trough.

19. The apparatus of claim 18 wherein both of said griddle portions have a grease trough therein.

20. The apparatus of claim 19 wherein each of said griddle portions is made of metal and each of said griddle portions carries thereon a glass cover to define an insulation space and aid in retaining heat on said griddle portions when a food article is cooked therebetween.

* * * * *